United States Patent [19]

Curtis et al.

[11] Patent Number: 5,439,335
[45] Date of Patent: Aug. 8, 1995

[54] APPARATUS FOR CUTTING A KEYWAY IN A MILL ROLL

[75] Inventors: Gary L. Curtis, River Falls, Wis.; Gregory A. Johnson, Dearborn Heights, Mich.; Paula M. Tuebo, Maplewood, Minn.

[73] Assignee: Minnesota Mining and Manufacturing Company, Saint Paul, Minn.

[21] Appl. No.: 260,518
[22] Filed: Jun. 16, 1994

Related U.S. Application Data

[62] Division of Ser. No. 85,285, Jun. 30, 1993, abandoned, which is a division of Ser. No. 971,940, Nov. 5, 1992, Pat. No. 5,247,740.

[51] Int. Cl.⁶ .......................................... B23D 37/04
[52] U.S. Cl. ............................... 409/259; 409/277
[58] Field of Search ............... 409/244, 288, 259, 260, 409/261, 269, 270, 304, 307, 277, 279, 275; 29/895.2, 895.21, 895.20; 492/40, 41, 45

[56] References Cited

U.S. PATENT DOCUMENTS

| | | | |
|---|---|---|---|
| 1,291,700 | 5/1918 | Acton | 409/277 |
| 2,324,050 | 7/1943 | Shelley | 68/127 |
| 2,510,835 | 6/1950 | Rice | 409/259 |
| 2,579,906 | 12/1951 | Cook | 130/5 |
| 2,801,461 | 8/1957 | Kusters | 29/120 |
| 2,987,802 | 6/1961 | Quinn | 29/125 |
| 3,111,742 | 11/1963 | Lakin | 29/125 |
| 3,137,919 | 6/1964 | Lakin | 29/148.4 |
| 3,853,677 | 12/1974 | Kai | 161/36 |
| 4,299,022 | 11/1981 | Kummerl | 29/450 |
| 4,375,128 | 3/1983 | Lindquist | 30/242 |
| 4,557,644 | 12/1985 | Scepanovic et al. | 409/143 |
| 4,669,163 | 6/1987 | Lux et al. | 29/125 |
| 4,778,314 | 10/1988 | Borys | 409/132 |
| 5,038,448 | 9/1991 | Gusmer | 29/125 |

FOREIGN PATENT DOCUMENTS

| | | | |
|---|---|---|---|
| 2741918 | 3/1979 | Germany | 409/259 |
| 2809552 | 9/1979 | Germany | 409/259 |
| 3106105 | 9/1982 | Germany | 409/304 |
| 3415487 | 10/1984 | Germany | 409/259 |
| 3415487 | 10/1984 | Germany | B23D 43/02 |
| 0008587 | 1/1977 | Japan | 409/259 |
| 14906 | of 1895 | United Kingdom . | |
| 492883 | 9/1938 | United Kingdom . | |
| 741292 | 1/1956 | United Kingdom . | |
| 1282988 | 1/1987 | U.S.S.R. | B23C 5/10 |
| 1514513 | 10/1989 | U.S.S.R. | 409/259 |

OTHER PUBLICATIONS

3M Technical Publication "3M Mill Rolls Technical Information and Application Guidelines" No. 61-50-00-9697-1 (1991).
3M Surface Conditioning Application Notes "3M Brand Mill Roll" No. 61-5000-2986-5 (Undated).
3M Surface Conditioning Application Notes "3M brand Mill Rolls Wringer Applications" No. 61-5000-6982-1 (Undated).
3M Surface Conditioning Application Notes "3M brand Mill Rolls Oiler Applications" No. 61-5000-6815-2 (Undated).
3M Surface Conditioning Application Notes "3M brand Acid Mill Rolls" No. 61-5000-6401-1 (Undated).
3M Surface Conditioning Research Notes "Recent Advances in Wringer Roll Technology" by Lloyd W. Legacy, Brochure No. 61-5000-2338-1 (Undated).
3M reprint entitled "New Method of Oiling Galvanized Steel Coil Improves Quality, Reduces Costs 50 Percent", Brochure No. 61-5000-4190-2 (Undated).
3M reprint entitled "New Type Mill Roll Reduces Downtime at Aluminum Plant", Brochure No. 61-50-00-2983-2 (Undated).
3M advertisement entitled "3M Mill Rolls", Brochure No. 61-5000-6804-6 (Aug. 1989).
3M advertisement entitled "Which wringer roll has been in use 30 months and saved over $60,000?"; Brochure No. 61-5000-9155-0 (1991).

Primary Examiner—William Briggs
Attorney, Agent, or Firm—Gary L. Griswold; Walter N. Kirn; James J. Trussell

[57] ABSTRACT

The present invention relates to a method and apparatus for forming a longitudinally extending keyway portion in a mill roll having a central bore. The keyway portion may be either a keyway or a tab portion. A cutting head is provided, and includes a body and one or more cutting tools extending from the periphery of the cutting head body. The cutting head is driven through the central bore of the mill roll, and the cutting tools form one or more keyway portions adjacent and communicating with the central bore.

31 Claims, 6 Drawing Sheets

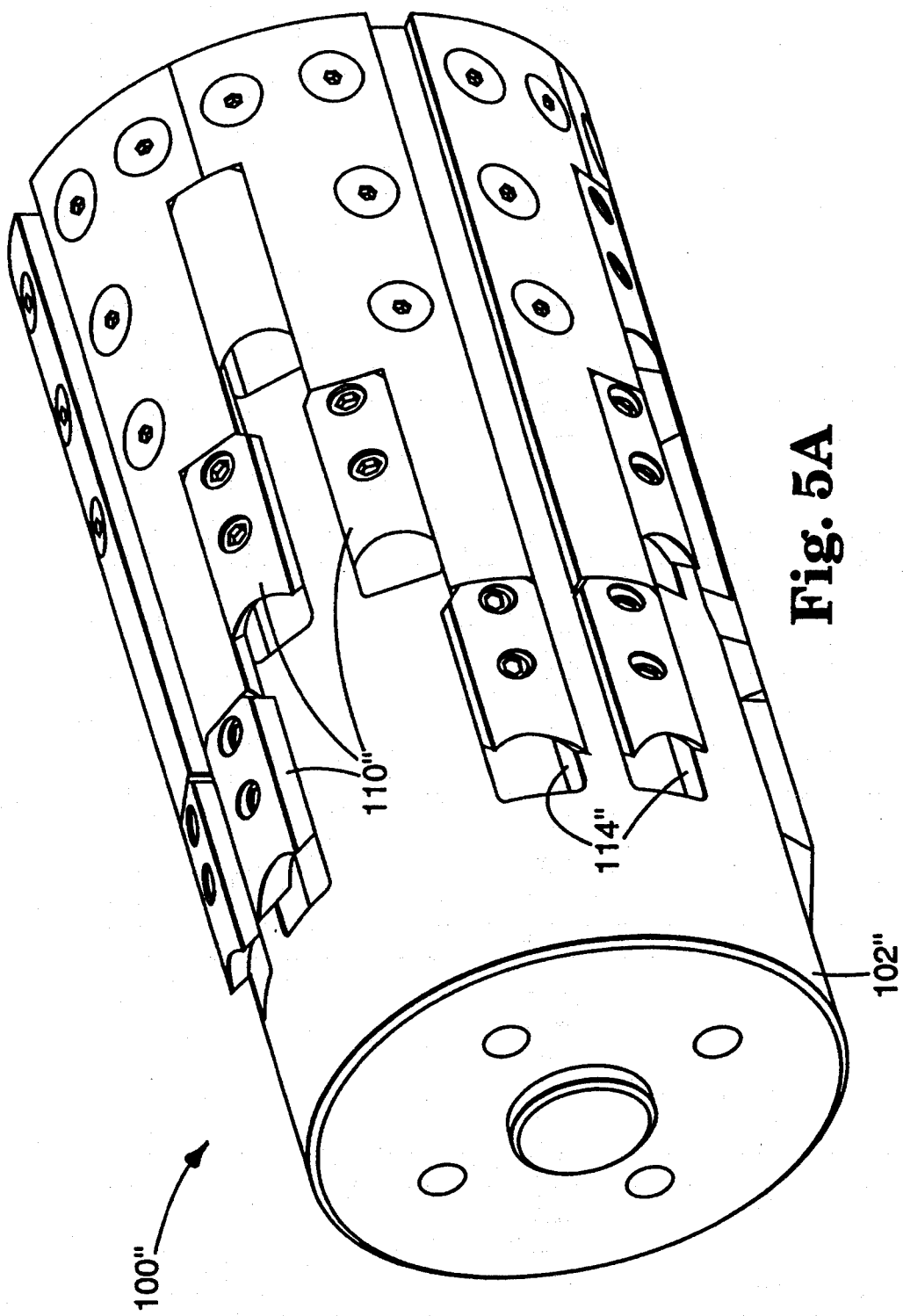

APPARATUS FOR CUTTING A KEYWAY IN A MILL ROLL

This is a division of application Ser. No. 08/085,285 filed Jun. 30, 1993, now abandoned, which is a division of application Ser. No. 07/971,940, filed Nov. 5, 1992, U.S. Pat. No. 5,247,740.

TECHNICAL FIELD

This invention relates to mill rolls, and specifically to a method and apparatus for cutting a keyway in a mill roll.

BACKGROUND OF THE INVENTION

Mill rolls are popular in the field of sheet metal fabrication, and are generally used to wipe contaminants from the surface of a metal sheet during or after manufacturing, or both. For example, the mill roll may have an outer diameter of 25.4 cm (10 in) and an inner diameter of 15.24 cm (6 in), and a width of 152 to 178 cm (60 to 70 in) to contact a sheet of the same or a lesser width. To remove contaminants from the surfaces of a sheet, the sheet is passed between two opposed mill rolls that compressively contact the surfaces of the sheet along its width. The mill rolls are typically either allowed to rotate freely at the same speed as the sheet, or driven in the opposite direction of the sheet to provide tension in the sheet. More importantly, in either application the mill rolls squeegee the surfaces of the sheet as the sheet passes between the mill rolls, to remove contaminants from the surfaces of the sheet.

The mill roll is generally tubular, and is disposed on a rigid cylindrical shaft that is rotatively supported, such as by opposed journal bearings, at each end of the shaft. Mill rolls may be made from one of several different materials. For example, rubber mill rolls generally consist of a resilient rubber tread that is carried on an elongate cylindrical shaft. When a sheet is passed between opposed rubber mill rolls, the rubber surfaces of the mill rolls squeegee the surfaces of the sheet to remove contaminants. Although rubber mill rolls may be desirable for some applications, they are easily defaced by protrusions in the metal sheets, which are common near a splice between the end of one sheet and the beginning of a second sheet. Once a rubber mill roll has been damaged, a cut, rip, or tear tends to allow contaminants to remain on the sheet, and therefore decreases the effectiveness of the rubber mill roll. If the cut, rip, or tear propagates along the surface of the rubber mill roll, the effectiveness of the mill roll may be further decreased.

Another type of mill roll is known as a fabric mill roll. An example of such a mill roll is disclosed in U.S. Pat. No. 4,669,163 (Lux et al.), the contents of which are incorporated by reference herein. Fabric mill rolls are resilient and relatively compressible compared to rubber mill rolls, and are made from an aligned plurality of discrete, circular mill roll discs. The mill roll discs are made of fabric (such as a nonwoven web of fibers), and each disc has a concentric central aperture, as shown in FIG. 1. In preparation for forming the mill roll, a plurality of mill roll discs 1 may be aligned and mounted on a shaft 2 as shown in FIG. 2. To consolidate the discrete mill roll discs 1 into a mill roll 3, the mill roll discs, which are typically saturated with a suitable bonding agent, are compressed and bonded together to form the mill roll, as shown in FIG. 2. For example, the individual mill roll discs may be saturated with a moisture activated adhesive, compressed under a force of approximately $20 \times 10^5$ to $55 \times 10^5$ Pa, and bonded together by the application of moisture to the mill roll. Collars 4 and 5 may also be provided to maintain a compressive force on mill roll 3, and to prevent mill roll 3 from moving along the length of shaft 2. The outer peripheral surface 6 of the mill roll, which is made up of the outer peripheral surfaces 7 of each of the individual mill roll discs, may be dressed, if necessary, to provide a smooth surface for contact with the surface of the sheet. The inner peripheral surfaces 8 of the individual mill roll discs collectively define central bore 9 of mill roll 3.

Fabric mill rolls have been found to be superior to rubber mill rolls for several reasons. Fabric mill rolls generally have an improved squeegee action, and are more resistant to damage because the surface of a fabric mill roll is self-healing. "Self-healing," as used herein, means that a cut or tear inflicted by a protrusion in the sheet generally will not result in a permanent defect in the face of the mill roll. That is, if the peripheral surface of one or more mill roll discs is damaged by a protrusion, the edges of the mill roll discs adjacent the damaged disc tend to expand into the area that was damaged, because of the pressure under which the discs are placed during formation of the mill roll, and due to the pressure applied to ends of the mill roll during operation. The expansion by the adjacent portions of the mill roll may take place over time (e.g. 1 to 3 hours), and after the expansion the mill roll will again tend to wipe the surface of the sheet effectively.

As described briefly above, fabric mill rolls are typically constructed by mounting dozens, hundreds, or even thousands of circular fabric mill roll discs on a shaft, as shown in FIG. 2. However, the frictional contact with the shaft may be insufficient to prevent rotation of the mill roll with respect to the shaft, which is undesirable because the frictional contact required to wipe a sheet adequately may not be present if the mill roll is free to rotate with respect to the shaft on which it is carried. It is therefore desirable to prevent the mill roll from rotating with respect to the shaft on which it is carried.

One solution to the foregoing problem is disclosed in the '163 patent referenced above. As shown in FIG. 3, a keyway 11 is formed along the length of shaft 2' and a key 12 is disposed within the keyway. The key projects radially from and extends longitudinally of the shaft. Each individual mill roll disc may then be provided with a keyway portion adjoining the center aperture, as shown in phantom lines 10 in FIG. 1, and the individual mill roll discs may be manually mounted on the keyed shaft by an operator. The resulting fabric mill roll is thereby prevented from rotating with respect to the shaft, which tends to improve the performance of the mill roll. Although this process of forming a mill roll is generally effective, a substantial amount of time and manual labor is required to place each fabric mill roll disc on the shaft, with the keyway and key aligned, to form the mill roll. For example, it can take between two and four hours for a worker to form a single mill roll comprising 2500 to 5000 mill roll discs, according to this method. It is therefore desirable to provide an easily manufactured mill roll that does not rotate with respect to the shaft on which it is mounted.

SUMMARY OF THE INVENTION

According to the present invention there is provided a method of forming a longitudinally extending keyway portion in a stack of fabric mill roll discs. The method comprises the steps of providing a plurality of fabric mill roll discs each having a concentric central aperture; aligning the plurality of fabric mill roll discs to form a stack of mill roll discs such that the central apertures collectively form a concentric central bore having a central longitudinal axis, the bore extending from a first end to a second end of the stack of mill roll discs; providing a cutting head comprising a body portion having a central longitudinal axis and adapted to pass longitudinally through the central bore, and a cutting tool radially extending from the body portion for cutting the keyway portion in the stack of mill roll discs adjacent and communicating with the central bore; aligning the longitudinal axis of the body portion with the longitudinal axis of the central bore at the first end of the stack of mill roll discs; and inducing relative motion between the cutting head and the stack of mill roll discs along the respective longitudinal axes to drive the cutting head from the first end of the stack of mill roll discs to the second end of the stack of mill roll discs to progressively cut the longitudinally extending keyway portion in the stack of mill roll discs. In another embodiment, the method further includes the steps of compressing the stack of mill roll discs along the longitudinal axis of the central bore; and bonding the stack of mill roll discs together to form a mill roll having a longitudinally extending keyway portion. The keyway portions may be either a longitudinally extending keyway, or a longitudinally extending tab portion, formed in the stack of mill roll discs by the removal of mill roll material from adjacent the central bore. Also provided is a mill roll having a longitudinally extending keyway portion formed according to the method recited above. In another embodiment, the method specifically relates to forming a keyway portion in a mill roll comprising an aligned plurality of mill roll discs compressively bonded together to form the mill roll.

Another aspect of the present invention relates to an apparatus for cutting a longitudinally extending keyway portion in a stack of fabric mill roll discs having a first end and a second end and a concentric central bore extending between the first and second ends, and a central longitudinal axis. The apparatus includes means for supporting the stack of mill roll discs; a cutting head having a body portion having a central longitudinal axis and adapted to pass longitudinally through the central bore, and means for cutting the keyway portion in the stack of mill roll discs adjacent and communicating with the central bore; and means for inducing relative motion between the cutting head and the stack of mill roll discs along the respective longitudinal axes to drive the cutting head from the first end of the stack of mill roll discs to the second end of the stack of mill roll discs to progressively cut the longitudinally extending keyway portion in the stack of mill roll discs.

BRIEF DESCRIPTION OF THE DRAWINGS

The invention will be more readily understood with reference to the accompanying drawings, wherein like reference numerals refer to like components throughout the several views, and wherein:

FIG. 5A is a perspective view of a third embodiment of a cutting head according to the present invention;

DETAILED DESCRIPTION OF THE INVENTION

The method and apparatus of the present invention is briefly described as follows, and will be explained in greater detail hereinafter. Individual fabric mill roll discs such as that shown in FIG. 1 (with a central aperture, but without any keyway portions 10) are axially aligned in a stack, as shown in FIG. 2. The stack may be in the form of individual discs, or in the form of a mill roll wherein the discs have been bonded together. A cutting head having one or more cutting tools corresponding to the shape, location and number of the desired keyway portions is then driven through a concentric central bore of the stack to form the keyways portions therein. The "keyway portion," as that term is used herein, may be either a keyway formed in a mill roll, or a tab portion formed in a mill roll, as described further below.

By cutting a keyway portion in the stack of mill roll discs, rather than in each of the individual mill roll discs prior to mutual alignment, a mill roll may be fabricated more quickly than the mill rolls of the prior art because the time required to align the keyway portions of each individual mill roll disc has been eliminated. The keyway portions formed by the method of the present invention may also be more precisely formed than those provided in mill rolls according to the prior art. The present invention generally has applicability to a stack of fabric mill roll discs, whether bonded together in the form of a mill roll or not. Thus, the present invention should be understood to have equal applicability to a stack of unbonded discs as well as to a stack of bonded discs.

Figure 4:
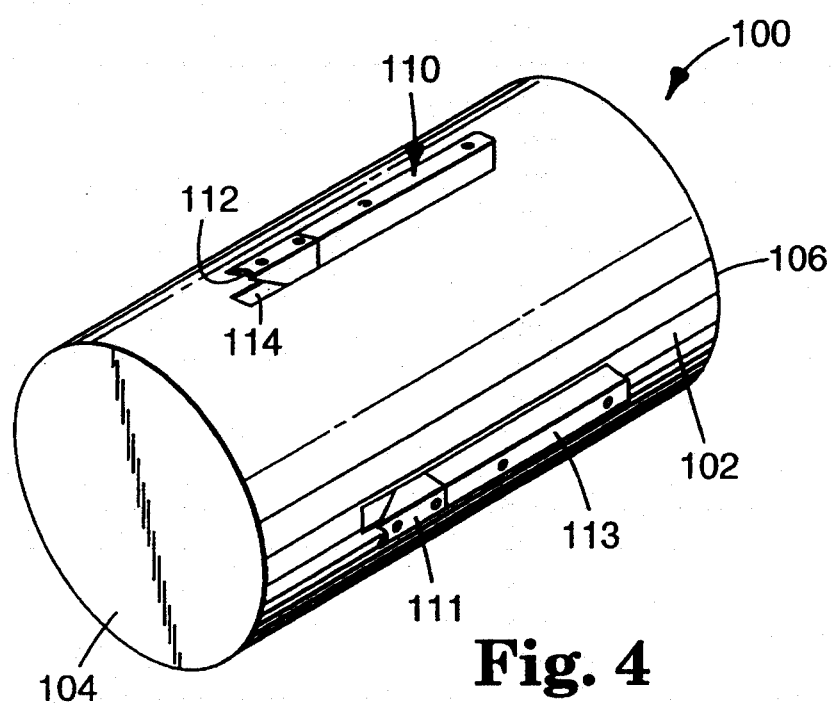
FIG. 4 is a perspective view of a cutting head according to the present invention.

As shown in FIG. 4, a cutting head 100 is provided and comprises a body 102 having a leading end 104 and a trailing end 106. Body 102 is preferably hollow, to enable collection of the portions of the mill roll disc material cut away to form the keyway portions. Cutting head 100 is illustrated as being generally cylindrical and is typically sized to permit the cutting head to slide through the central bore of the stack of mill roll discs. Other shapes and sizes of cutting heads are also contemplated, and thus the scope of the present invention should not be limited to the illustrated embodiment.

Figure 3:
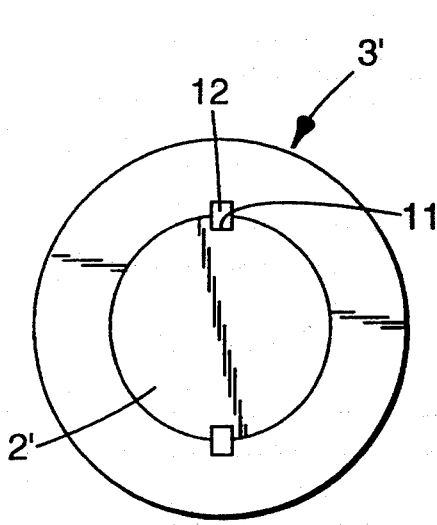
FIG. 3 is an end view of a fabric mill roll having a keyway and a key.
Figure 7:
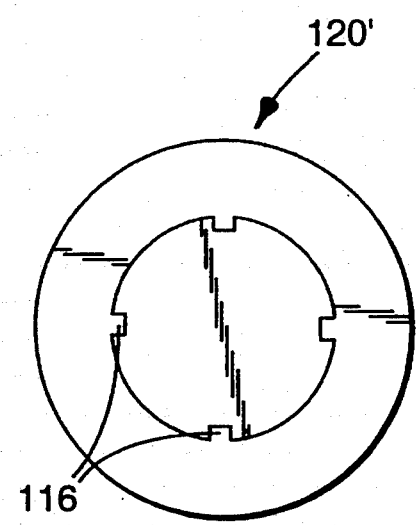
FIG. 7 is an end view of a reverse mill roll.

Spaced about the periphery of body 102 are means for cutting keyway portions in a stack of mill roll discs, and are illustrated herein as cutting tools 110. Mill rolls that include a keyway adjacent the center aperture are known as "positive" mill rolls, and may be formed by a cutting head such as that shown in FIG. 4. For purposes of this invention, a "positive" mill roll is one that is adapted for use with a shaft having one or more radially projecting, longitudinally extending keys that cooperate with one or more keyways in the mill roll. A "reverse" mill roll is one that is adapted for use with a shaft having one or more keyways recessed into the shaft, into which one or more longitudinally extending tab structures of the mill roll fit. For example, FIG. 3 illustrates a positive mill roll, wherein the shaft includes a plurality of keys that cooperate with the keyways formed in the mill roll. FIG. 7 illustrates a reverse mill roll, wherein tabs 116 extend into keyways formed in the shaft on which the mill roll is carried.

It should be noted that "reverse" and "positive" are relative terms, because a positive mill roll having keyways that extend about a substantial portion of the circumference of the central bore may also be described as a reverse mill roll. Similarly, a reverse mill roll having one or more tab portions extending about a substantial portion of the circumference of the central bore may also be described as a positive mill roll. In the present context, "positive" will be used to denote a mill roll having keyways that extend about a relatively small portion of the circumference of the central bore, and "reverse" will be used to describe a mill roll having tab portions that extend about a relatively small portion of the circumference of the central bore.

Both positive and reverse mill rolls include one or more longitudinally extending keyway portions. A keyway portion, as described briefly above, may be either a keyway that is adapted to receive a key projecting radially from and extending longitudinally of a shaft, or a tab portion that is adapted to fit within a keyway formed in a shaft and extending longitudinally thereof. Keyway portions could also be triangular, or any other profile, to cooperatively engage the corresponding keys or keyways of a shaft. For example, a plurality of triangular keyways could be cut into a stack of mill roll discs to engage a star shaped shaft. Thus the method and apparatus of the present invention may be adapted to form different sizes, shapes, and numbers of keyway portions, as desired.

Figure 6:
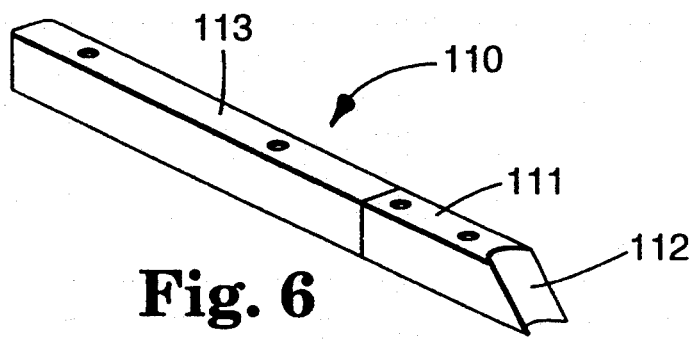
FIG. 6 is a perspective view of a cutting tool according to the present invention.

The present invention will now be described in the context of cutting one or more longitudinally extending keyways into a mill roll to form a positive mill roll, although other keyway portions (such as longitudinally extending tab portions for a reverse mill roll) could be provided instead with appropriate modifications. Either two, four, or six keyways are usually preferred, although more or less may be provided as desired. Cutting tools 110 are positioned about the periphery of body 102 to correspond to the perimetric location of the projecting keys on the shaft. Cutting tools 110 are preferably formed from a material, such as heat treated tool steel, that is resistant to the wear caused by cutting a keyway in fabric mill roll material. In one embodiment, part or all of the cutting tool is removable, to enable a dull cutting tool to be removed, sharpened, and replaced. For example, cutting tool 110 shown in FIG. 6 includes a cutting portion 111 and a separate guiding portion 113. Cutting portion 111 may be separately removed, sharpened, and replaced as necessary.

The leading edges of the cutting tools are preferably hardened to prevent premature wear or damage. Leading surface 112 of cutting tool 110 is preferably inclined with respect to body 102 as shown in FIG. 4, to reduce the amount of force required to drive cutting head 100 through the stack of mill roll discs. Leading surface 112 may also be concave, such that the outer edges of cutting tool 110 contact the stack of mill roll discs before the remainder of the leading surface contacts the same portion of the stack. This concavity could comprise, for example, a curved profile or a V-shape. An opening 114 is preferably formed anterior of cutting tools 110, which when coupled with a hollow body enables the material that is cut from the stack of mill roll discs to collect inside cutting head 100. Although several designs have been discussed herein, it should be understood that the design of cutting tools 110 may be selected as appropriate to the size and type of the stack of mill roll discs and the cutting characteristics desired.

Figure 5:
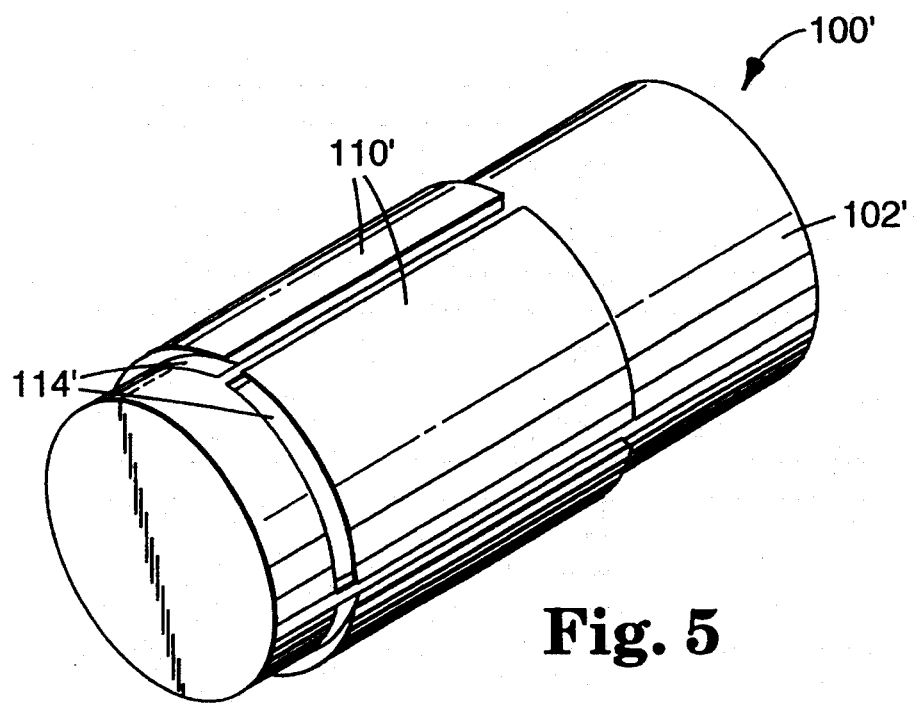
FIG. 5 is a perspective view of a second embodiment of a cutting head according to the present invention.

FIG. 5 illustrates an alternate embodiment of the cutting head. Cutting head 100' includes cutting tools 110' that extend around a substantial portion of the periphery of body 102'. Also provided are openings 114', which are adapted to collect material cut from the stack of mill roll discs adjacent the central bore. The illustrated arrangement enables cutting head 100' to cut keyway portions in the form of longitudinally extending tab portions 116, as provided on the reverse mill roll illustrated in FIG. 7. Reverse mill rolls have the added advantage that no separate key is required, as compared to positive mill rolls, because the tab portions cooperate with keyways formed in the shaft on which the mill roll is carried to prevent relative rotation between the mill roll and the shaft. As with the keyways of the positive mill rolls discussed above, reverse mill rolls can be constructed with various numbers, positions, and sizes of tab portions.

FIG. 5A illustrates an alternate embodiment of a cutting head 100" that includes a plurality of cutting tools 110" mounted on body 102". Cutting tools 110" are staggered along the length of body 102", and may provide improved cutting characteristics. Openings 114" are also provided to collect material cut from the mill roll discs by cutting tools 110".

The cutting head and cutting tools shown and described herein are intended to be illustrative rather than limiting. Thus the cutting tools of the present invention could comprise mechanical cutters, a heated knife, wire, or the like, a laser, or other cutting means as known in the art. The body of the cutting head could take many shapes, including but not limited to the cylindrical shape shown in the appended figures.

Figure 8A:
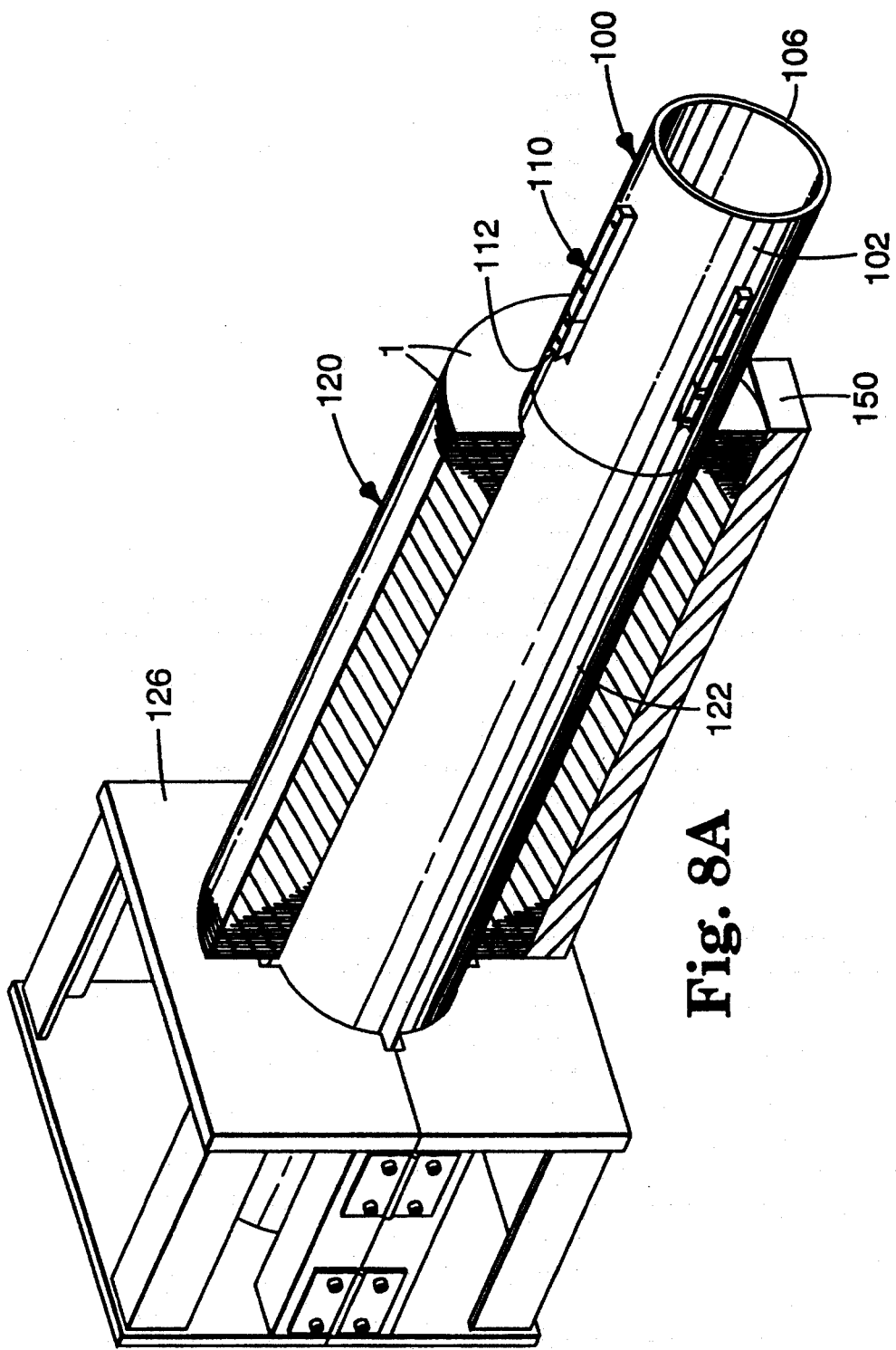
FIGS. 8A, 8B, and 8C illustrate successive stages in the method of the present invention.
Figure 8B:
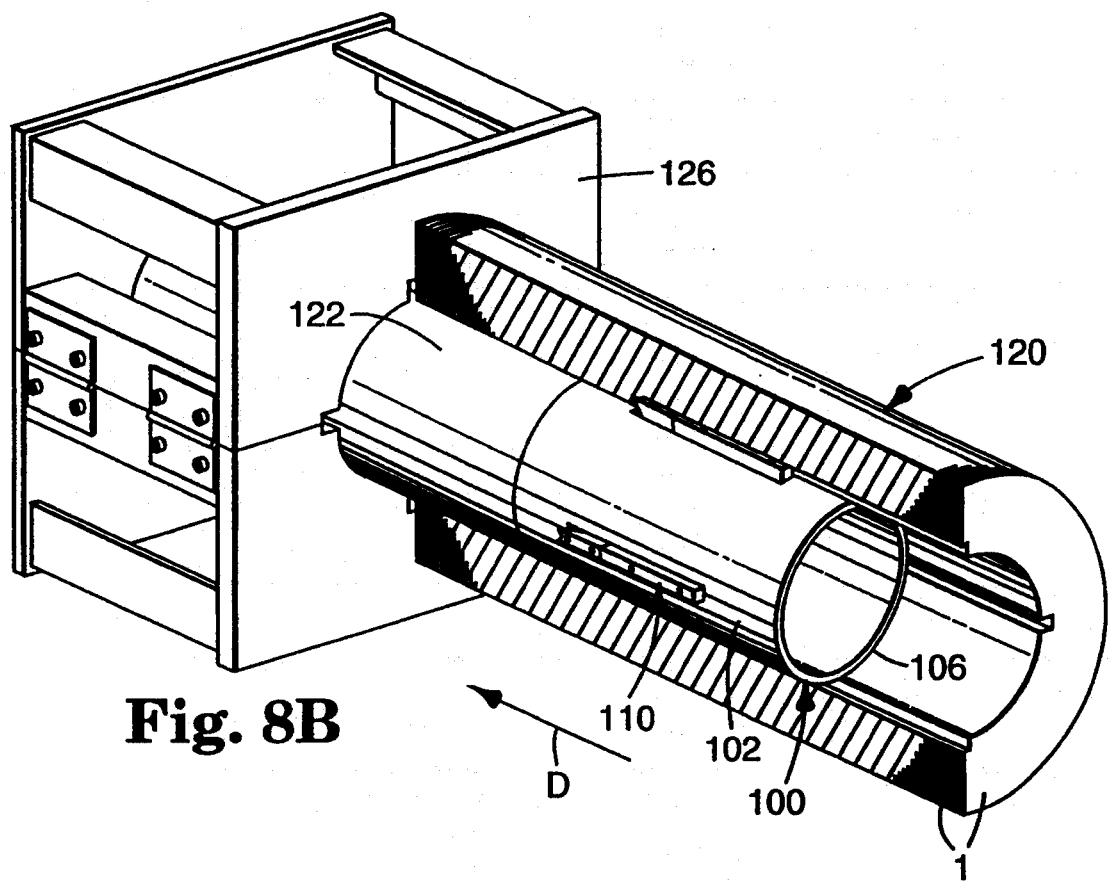
Figure 8C:
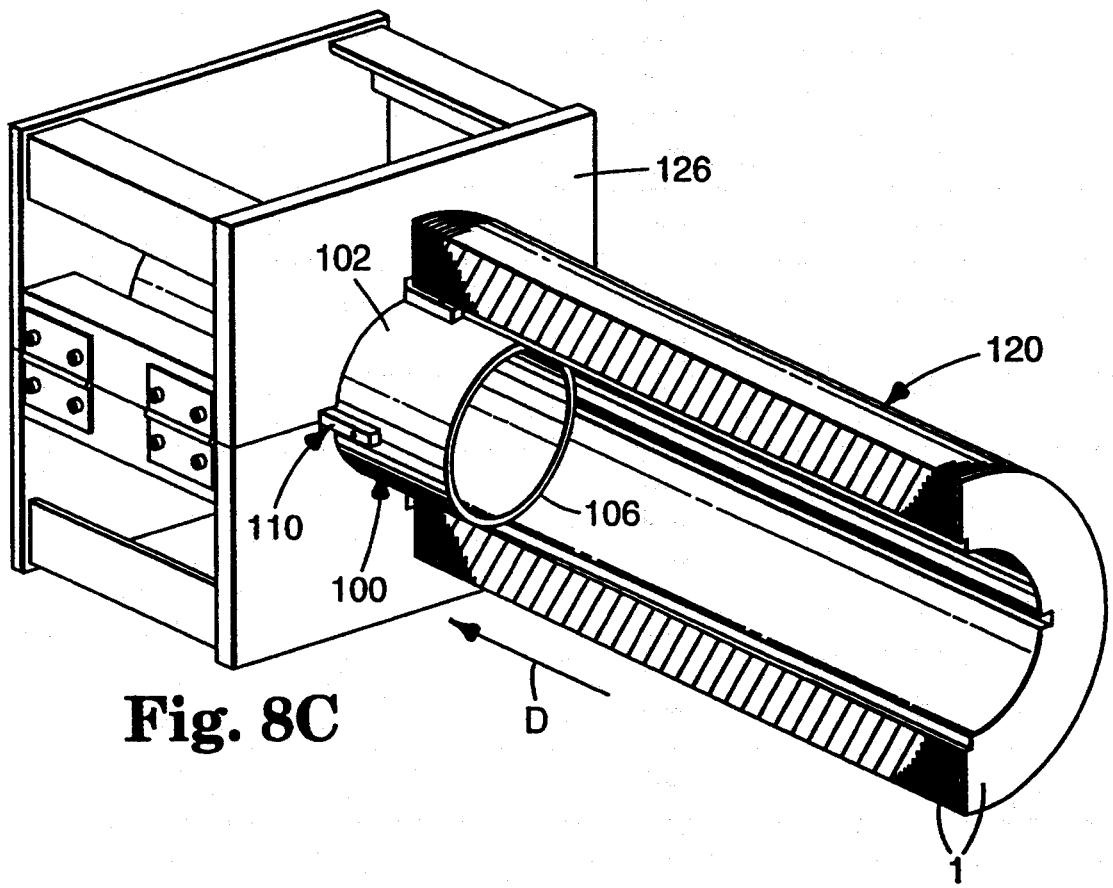

The method of the present invention is generally illustrated in FIGS. 8A, 8B, and 8C, and is shown with reference to the formation of a longitudinally extending keyway in a stack of mill roll discs. The keyways are preferably formed in a stack of mill roll discs that have been bonded together to form a mill roll, although with suitable modifications a keyway portion could instead be cut into a stack of discrete discs that would thereafter be bonded together to form the mill roll. In the illustrated embodiment, the mill roll discs have been compressed and bonded to form a mill roll as known in the art, and as generally disclosed in U.S. Pat. No. 4,669,163 (Lux et al.), incorporated by reference above. For simplicity, the present method will be described with reference to the forming of longitudinally extending keyways, as opposed to tab portions, in a stack of mill roll discs.

Figure 1:
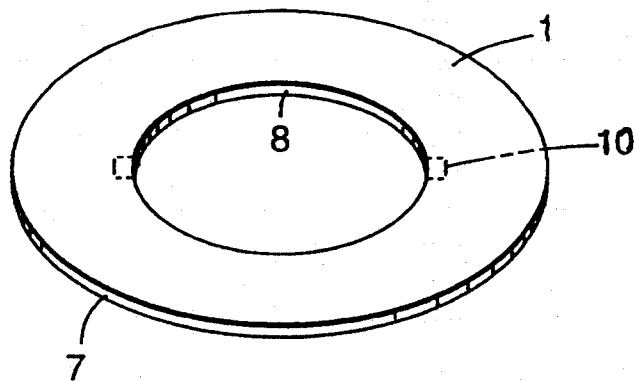
FIG. 1 is a perspective view of a single fabric mill roll disc for forming a mill roll according to the prior art.
Figure 2:
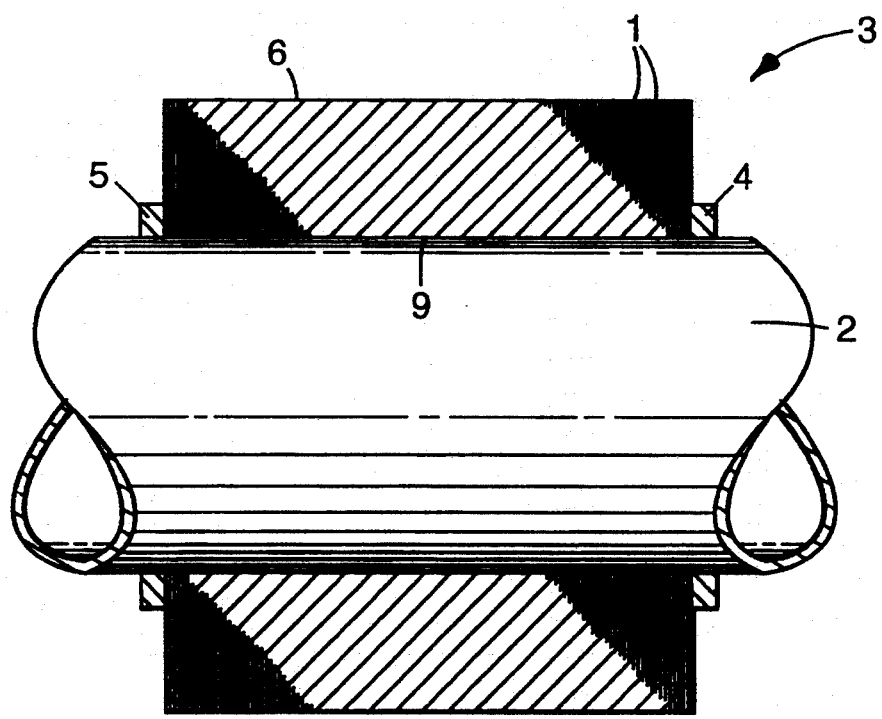
FIG. 2 is a sectional view of a fabric mill roll and shaft according to the prior art.

As shown in FIG. 8A, a stack 120 of fabric mill roll discs is mounted on a making shaft 122 and comprises a multiplicity of individual mill roll discs such as that shown in FIG. 1 (with a central aperture, but without any keyways 10). Other means for aligning the mill roll discs in stack 120 are contemplated, although only making shaft 122 will be discussed herein. Making shaft 122 may be hollow or solid, and is typically of approximately the same diameter as the center holes of the mill roll discs to permit the making shaft to slide through the mill roll, but could be of a different size or shape if desired. Cutting head 100 includes at least one cutting tool 110, which is adapted to cut a keyway having a desired shape in stack 120 in the manner generally described above. For example, a keyway measuring 1.27 cm (0.5 in) square has been shown to accommodate a key of approximately the same size. Means for supporting stack 120 is also provided, and is illustrated schematically at 150 in FIG. 8A.

Cutting head 100 is typically attached to an end of making shaft 122, and relative motion between cutting head 100 and stack 120 results in the cutting tools forming keyways in the stack 120. For example, the stack 120 could be held in place, and the cutting head could be pushed or pulled through the stack 120 to form the keyways. Alternatively, cutting head could be held in place, and the stack 120 driven over the cutting head to form the keyways. In yet another embodiment, the stack 120 and the cutting head could each be driven with respect to the other to form the keyways in the stack 120. A receiver 126 is positioned adjacent the distal end of stack 120 to support the stack against the pressure applied by the end of stack 120 and to receive cutting head 100 at the end of the keyway cutting process. Receiver 126 is preferably structured to contact as much of the end of stack 120 as possible, to prevent fraying of the end of the stack as cutting head 100 exits the stack 120.

As shown in FIG. 8B, making shaft 122 has been partially driven through receiver 126 in direction D, and cutting head 100 is at approximately the midpoint of the stack 120. Cutting head 100 may be driven through stack 120 at any desired velocity, although speeds of between 0.076 and 0.127 m/s (0.25 and 0.42 ft/s) have been shown to be acceptable. The force used to drive cutting head 100 varies depending on the stack 120 and the design of the cutting head. Forces of $8.9 \times 10^3$ to $2.225 \times 10^4$ N (2000 to 10,000 lbs) have been used with success. The foregoing parameters were determined with reference to a fabric mill roll comprising nonwoven nylon fibers and having a density of approximately 0.71 g/cm$^3$ (0.026 lb/in$^3$).

FIG. 8C illustrates the conclusion of the process for cutting keyways in stack 120. Cutting head 100 is positioned within receiver 126, and making shaft 122 has been driven in direction D through the receiver. A key having a length substantially equal to that of the stack 120 may then be inserted into the keyway to prevent the stack 120 from rotating with respect to the shaft.

An advantage of the present method and apparatus lies in the greatly reduced time required to form keyway portions in a stack of mill roll discs. Whereas mill rolls assembled according to the prior art could require several hours to complete due to the manual alignment of several thousand individual discs, mill rolls of similar size formed according to the present method may be completed in as little as 30 to 60 minutes, depending on working conditions.

A further advantage of the mill rolls provided with a keyway portion according to the present invention is that the keyway portion is more precisely formed than by the prior art methods. For example, mill rolls constructed according to the prior art include keyways having relatively uneven side walls, because individual mill roll discs typically are not perfectly aligned when they are placed on the making shaft. Each mill roll disc thus tends to protrude slightly into the keyway on one side or the other, depending on whether the mill roll disc is rotated slightly in one direction or the other during mounting, relative to the remainder of the mill roll discs. With the method and apparatus of the present invention, a relatively uniform keyway can be provided, resulting in improved fit between the keyway and the key. In some cases, mill rolls having keyway portions formed according to the present invention can be visually distinguished from mill rolls having keyways formed according to the prior art, because the misregistration between adjacent, manually aligned mill roll discs comprising prior art mill rolls may be apparent to the naked eye.

The present invention has now been described with reference to several embodiments thereof. It will be apparent to those skilled in the art that many changes can be made in the embodiments described without departing from the scope of the invention. For example, the relative dimensions and materials of the mill roll, the cutting head, and the cutting tools can be altered depending on the application. Thus, the scope of the present invention should not be limited to the structures described herein, but only by structures described by the language of the claims and the equivalents of those structures.

We claim:

1. An apparatus for cutting a longitudinally extending keyway portion in a stack of mill roll discs comprising:
   (a) a cutting head comprising:
      (i) a cylindrical body portion having a central longitudinal axis, and
      (ii) a cutting tool provided on said body portion for cutting the keyway portion;
   (b) a stack of mill roll discs including a first end, a second end, a concentric central bore extending between said first and second ends, and a central longitudinal axis;
   (d) means for supporting said stack of discs; and
   (e) means for inducing relative motion between said cutting head and said stack of discs along the respective longitudinal axes to drive said cutting head through said bore from said first end to said second end of said stack of discs to progressively cut the longitudinally extending keyway portion in said stack of discs;
   wherein said body portion is sized to slide along said central bore thereby maintaining said body portion concentric with said central bore.

2. The apparatus of claim 1, wherein said stack of discs are bonded together.

3. The apparatus of claim 1, wherein said cutting tool cuts the keyway such that a portion of the keyway communicates with said central bore and the remainder of the keyway is bounded by said mill roll discs.

4. The apparatus of claim 1, wherein said cutting tool cuts a substantially rectangular keyway.

5. The apparatus of claim 1, wherein said sharpened edge cuts a substantially triangular keyway.

6. The apparatus of claim 1, wherein said body portion is sized to slide along the central bore of the stack of mill roll discs substantially along the entire circumference of said body portion.

7. The apparatus of claim 1, wherein said cutting head further includes a hollow interior and an opening formed adjacent said cutting means and in communication with said interior to receive material cut from said stack of mill roll discs.

8. An apparatus for cutting a longitudinally extending keyway portion in a stack of fabric mill roll discs having a first end and a second end and a concentric central bore extending between the first and second ends, and a central longitudinal axis, the apparatus comprising:
(a) means for supporting the stack of mill roll discs;
(b) a cutting head comprising:
(i) a body portion having a central longitudinal axis and adapted to pass longitudinally through the central bore, and
(ii) means provided on said body portion for cutting the keyway portion in the stack of mill roll discs adjacent and communicating with the central bore; and
(c) means for inducing relative motion between said cutting head and the stack of mill roll discs along the respective longitudinal axes to drive said cutting head from the first end of the stack of mill roll discs to the second end of the stack of mill roll discs to progressively cut the longitudinally extending keyway portion in the stack of mill roll discs;
wherein said supporting means supports the stack of mill roll discs such that said longitudinal axis of said cutting head body portion is substantially coextensive with the longitudinal axis of the stack of mill roll discs.

9. The apparatus of claim 8, wherein said cutting means is configured to remove mill roll material from adjacent the central bore thereby forming the keyway adapted for cooperative engagement with a longitudinally extending key radially projecting from a shaft adapted to support the mill roll discs.

10. The apparatus of claim 8, wherein said cutting means is configured to remove mill roll material from adjacent the central bore thereby forming the keyway comprising a longitudinally extending tab portion adapted for cooperative engagement with a longitudinally extending keyway formed in a shaft adapted to support the mill roll discs.

11. The apparatus of claim 8, wherein said apparatus further includes a receiver for receiving said cutting head when it exits the stack of mill roll discs after cutting the keyway portion therein.

12. The apparatus of claim 8, wherein said cutting means comprises a cutting tool including a sharpened edge.

13. The apparatus of claim 8, wherein said apparatus includes a plurality of cutting means evenly angularly spaced about said body.

14. The apparatus of claim 8, wherein said cutting head further includes an internal material receiving cavity and an opening formed adjacent said cutting means and in communication with said cavity to receive material cut from the mill roll to form the keyway portion.

15. The apparatus of claim 8, wherein the stack of mill roll discs has been bonded together to form a mill roll.

16. The apparatus of claim 8, wherein said body portion is cylindrical.

17. The apparatus of claim 16, further comprising a plurality of cutting means provided on said body portion.

18. The apparatus of claim 17, wherein said plurality of cutting means are evenly angularly spaced about the circumference of said body portion.

19. The apparatus of claim 16, wherein said body portion is sized to slide along the central bore of the stack of mill roll discs thereby maintaining said body portion concentric with the central bore of the stack of mill roll discs.

20. The apparatus of claim 19, wherein said body portion is sized to slide along the central bore of the stack of mill roll discs substantially along the entire circumference of said body portion.

21. The apparatus of claim 19, wherein said body portion further includes a material receiving cavity and an opening formed adjacent said cutting means and in communication with said cavity to receive material cut from the stack of mill roll discs.

22. The apparatus of claim 12, wherein said cutting tool further comprises:
a cutting portion including said sharpened edge on a leading edge of said cutting portion, and
a guiding portion extending parallel to said longitudinal axis of said cutting head body portion and located opposite said leading edge of said cutting portion, wherein said guiding portion maintains said cutting edge aligned with an already formed portion of the keyway as said cutting head is driven through the stack of mill roll disks.

23. The apparatus of claim 12, wherein said sharpened edge is configured to cut the keyway such that a portion of the keyway is in communication with the central bore and the remainder of the keyway is bounded by the mill roll.

24. The apparatus of claim 23, wherein said sharpened edge cuts a substantially rectangular keyway.

25. The apparatus of claim 23, wherein said sharpened edge cuts a substantially triangular keyway.

26. The apparatus of claim 8, further comprising a shaft supporting said cutting head, wherein said shaft is configured to slide along the central bore.

27. An apparatus for cutting a longitudinally extending keyway portion in a stack of discs having a first end, a second end, a concentric central bore extending between the first and second ends, and a central longitudinal axis, the apparatus comprising:
(a) a cutting head comprising:
(i) a cylindrical body portion having a central longitudinal axis and adapted to pass longitudinally through the central bore, and
(ii) a cutting tool provided on said body portion for cutting the keyway portion in the stack of discs adjacent and communicating with the central bore;
(b) means for supporting the stack of discs; and
(c) means for inducing relative motion between said cutting head and the stack of discs along the respective longitudinal axes to drive said cutting head from the first end of the stack of discs to the second end of the stack of discs to progressively cut the longitudinally extending keyway portion in the stack of discs;
wherein said body portion is sized to slide along the central bore of the stack of discs thereby maintaining said body portion concentric with the central bore of the stack of discs.

28. The apparatus of claim 27, further comprising plurality of said cutting tools evenly angularly spaced about the circumference of said body portion.

29. The apparatus of claim 27, wherein said body portion is sized to slide along the central bore of the stack of mill roll discs substantially along the entire circumference of said body portion.

30. The apparatus of claim 27, wherein said cutting head further includes a hollow interior and an opening formed adjacent said cutting tool and in communication with said interior to receive material cut from the stack of mill roll discs.

31. The apparatus of claim 27, further comprising a shaft supporting said cutting head, wherein said shaft is configured to slide along the central bore of the stack of discs.

* * * * *